United States Patent
Wang et al.

(10) Patent No.: US 9,879,593 B2
(45) Date of Patent: Jan. 30, 2018

(54) SYSTEM AND METHOD FOR ADAPTIVELY LEARNING VALUES AND CONTROLLING A TURBOCHARGER OF AN ENGINE BASED ON THE VALUES

(71) Applicant: GM Global Technology Operations LLC, Detroit, MI (US)

(72) Inventors: Yue-Yun Wang, Troy, MI (US); Steven E. Muldoon, Royal Oak, MI (US); Jörg Bernards, Katzenelnbogen (DE); Martin Suchy, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 14/957,758

(22) Filed: Dec. 3, 2015

(65) Prior Publication Data
US 2017/0159554 A1  Jun. 8, 2017

(51) Int. Cl.
*F02B 37/18* (2006.01)
*F02B 37/22* (2006.01)
*F02B 37/24* (2006.01)

(52) U.S. Cl.
CPC ............ *F02B 37/186* (2013.01); *F02B 37/18* (2013.01); *F02B 37/22* (2013.01); *F02B 37/24* (2013.01); *F05B 2220/40* (2013.01)

(58) Field of Classification Search
CPC .......... F02B 37/18; F02B 37/22; F02B 37/24; F02D 41/0007; Y02T 10/144
See application file for complete search history.

(56) References Cited

U.S. PATENT DOCUMENTS

2014/0067230 A1* 3/2014 Liu .................... F02D 41/0007
701/102
2014/0227109 A1* 8/2014 Wang .................... F02B 37/12
417/53

* cited by examiner

*Primary Examiner* — Audrey K Bradley

(57) ABSTRACT

A system according to the principles of the present disclosure includes a target turbocharger position module and a turbocharger control module. The target turbocharger position module determines a target position of a turbocharger based on a relationship between power generated by a compressor of the turbocharger, inertia of a shaft in a turbine of the turbocharger, and power generated by the turbine. The target turbocharger position includes at least one of a target vane position and a target wastegate position. The turbocharger control module controls the turbocharger based on the target turbocharger position.

18 Claims, 5 Drawing Sheets

SYSTEM AND METHOD FOR ADAPTIVELY LEARNING VALUES AND CONTROLLING A TURBOCHARGER OF AN ENGINE BASED ON THE VALUES

FIELD

The present disclosure relates to internal combustion engines, and more specifically, to systems and methods for adaptively learning values and controlling a turbocharger of an engine based on the adaptively learned values.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. A fuel control system adjusts the rate that fuel is injected to provide a desired air/fuel mixture to the cylinders. Increasing the amount of air and fuel provided to the cylinders typically increases the torque output of the engine.

Turbochargers are used to increase the efficiency of internal combustion engines by forcing additional air into the cylinders. Turbochargers include a turbine and a compressor. The turbine is driven by exhaust gas produced by the engine and, in turn, drives the compressor using the power of the exhaust gas. The compressor then compresses air entering the cylinders to force more air into the cylinders. The amount of boost (the amount of intake air compression) provided by a turbocharger is typically controlled by adjusting the position of a wastegate that allows exhaust gas to bypass the turbine. The amount of boost provided by a variable geometry turbocharger is controlled by adjusting the position of vanes within the variable geometry turbocharger.

SUMMARY

A system according to the principles of the present disclosure includes a target turbocharger position module and a turbocharger control module. The target turbocharger position module determines a target position of a turbocharger based on a relationship between power generated by a compressor of the turbocharger, inertia of a shaft in a turbine of the turbocharger, and power generated by the turbine. The target turbocharger position includes at least one of a target vane position and a target wastegate position. The turbocharger control module controls the turbocharger based on the target turbocharger position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Engine control systems typically control the position of a turbocharger using a feedback approach by minimizing the error between an actual value of a pressure ratio across a compressor of the turbocharger and a target value of the compressor pressure ratio. The compressor pressure ratio is determined based on inputs from pressure sensors disposed upstream and downstream of the compressor. Thus, if one or both of these sensors develops a fault, the turbocharger position is not controlled as desired.

To avoid this issue, some engine control systems may use a feedforward approach in addition to or instead of the feedback approach described above. In addition, the feedforward approach may improve the transient system response. The feedforward approach typically involves determining a target value of the turbocharger position using a physics-based model. However, existing physics-based models do not accurately capture the physics of the turbocharger system, which adversely affects turbocharger position control. In addition, existing physics-based models include coefficients which are determined through time-consuming calibration work.

A system and method according to the present disclosure controls the position of the turbocharger using both a feedforward approach and a feedback approach. The feedforward approach involves determining a target turbocharger position using a physics-based model in linear parameter varying (LPV) form that accurately captures the physics of the turbocharger system. In addition, the physics-based model includes coefficients that are adaptively learned over time using modified least squares or Kalman filtering, which eliminates calibration work. Further, adaptively learning the coefficients enables the system and method to account for changing engine operating conditions such as system aging, which further improves turbocharger position control.

Figure 1:
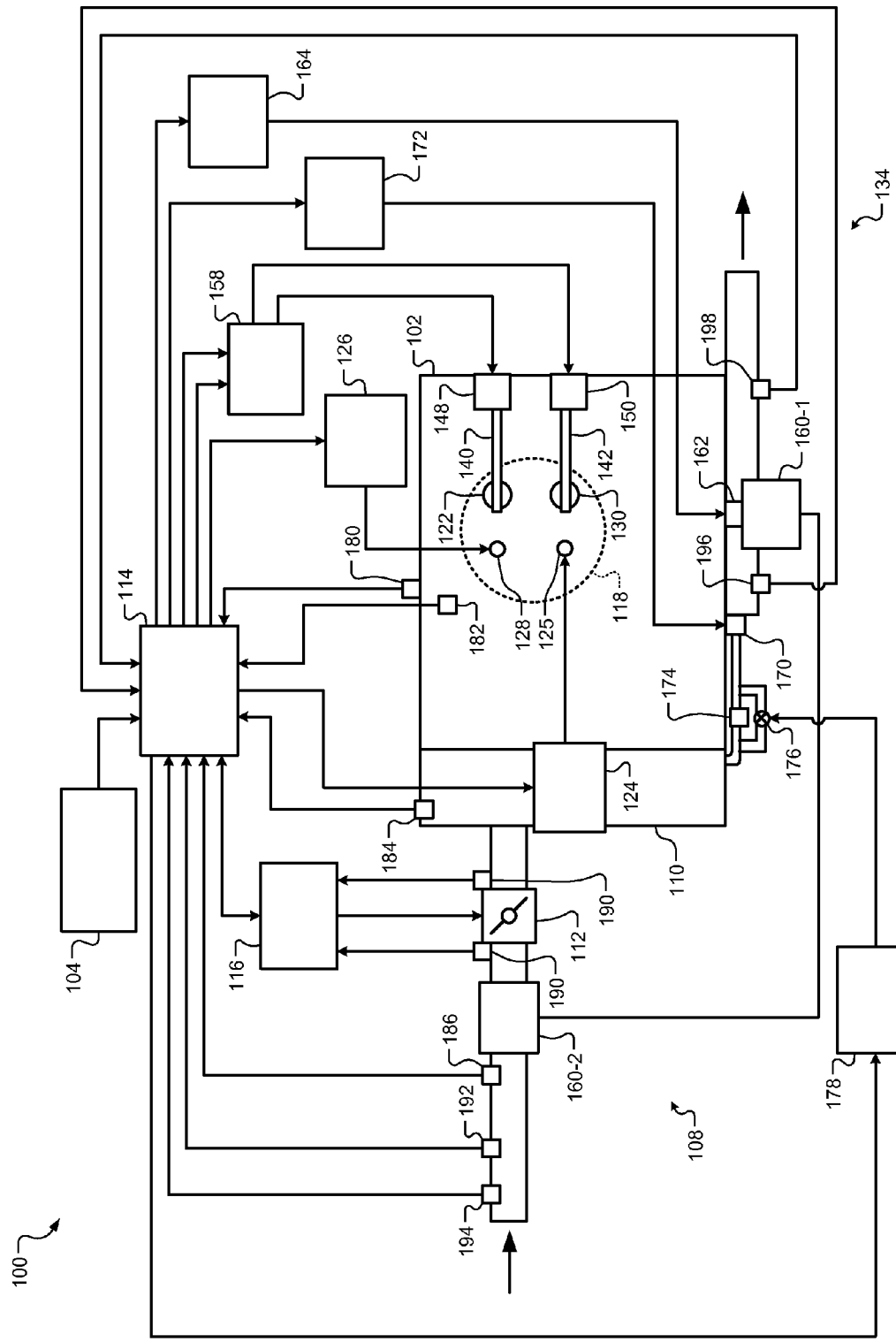
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may actuate the intake valve 122 and/or the exhaust valve 130 using devices other than camshafts, such as electromagnetic or electrohydraulic actuators.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. Alternatively, the turbocharger may be a variable geometry turbocharger, and the boost actuator module 164 may modulate the boost of the turbocharger by controlling the position of adjustable vanes (not shown) in the turbocharger. In various implementations, multiple turbochargers may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The exhaust system 134 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The exhaust system 134 may also include an EGR cooler 174 and an EGR cooler bypass valve 176. The EGR cooler 174 may be located downstream of the HP EGR valve 170 and may cool high pressure exhaust gas flowing through the HP EGR valve 170. The EGR cooler bypass valve 176 may allow high pressure exhaust gas to bypass the EGR cooler 174 when the EGR cooler bypass valve 176 is open. The EGR cooler bypass valve 176 may be controlled by a bypass actuator module 178 based on signals from the ECM 114. The ECM 114 may open the EGR cooler bypass valve 176 when the engine 102 is initially started to increase the temperature of the engine 102 and/or components of the exhaust system 134 to their operating temperatures faster.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ambient pressure of air being drawn into the engine 102 may be measured using an intake air pressure (IAP) sensor 194.

The temperature of exhaust gas produced by the engine 102 may be measured using an exhaust temperature (EXT) sensor 196. The EXT sensor 196 may be located in the exhaust system 134 upstream of the turbine 160-1 as shown. The pressure of exhaust gas on an outlet side of the turbine 160-1 may be measured using a turbine outlet pressure (TOP) sensor 198. The ECM 114 uses signals from the sensors to make control decisions for the engine system 100.

Figure 2:
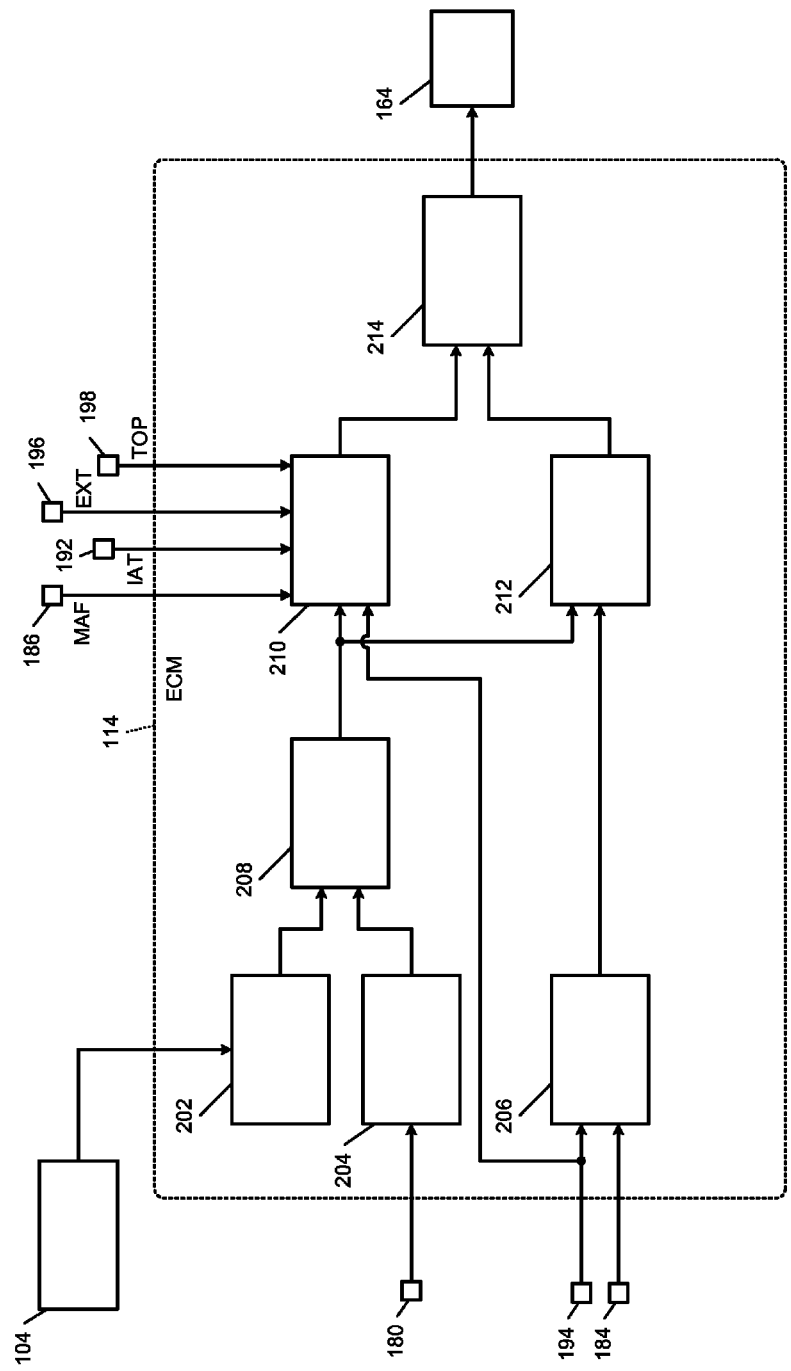
FIGS. 2-4 are functional block diagrams of example control systems according to the principles of the present disclosure.

Referring now to FIG. 2, an example implementation of the ECM 114 includes a desired torque module 202, an engine speed module 204, and an actual pressure ratio module 206, and a reference pressure ratio module 208. The desired torque module 202 determines a desired torque based on the driver input from the driver input module 104. The desired torque module 202 may store one or more mappings of accelerator pedal position to target torque and may determine the desired torque based on a selected one of the mappings. The desired torque module 202 outputs the desired torque.

The engine speed module 204 determines the speed of the engine 102 based on the crankshaft position from the CKP sensor 180. For example, the engine speed module 204 may calculate the engine speed based on a period that elapses as the crankshaft completes one or more revolutions. The engine speed module 204 outputs the engine speed.

The actual pressure ratio module 206 determines an actual value of the pressure ratio across the compressor 160-2 of the turbocharger. The actual pressure ratio module 206 may determine the actual compressor pressure ratio based on the manifold pressure measured by the MAP sensor 184 and the ambient pressure measured by the IAP sensor 194. For example, the actual pressure ratio module 206 may divide the manifold pressure by the ambient pressure to obtain the actual compressor pressure ratio. The actual pressure ratio module 206 outputs the actual compressor pressure ratio.

The reference pressure ratio module 208 determines a target or reference value for the pressure ratio across the compressor 160-2 of the turbocharger. The reference pressure ratio module 208 may determine the reference compressor pressure ratio based on the desired torque and the engine speed. For example, the reference pressure ratio module 208 may determine the reference compressor pressure ratio using a lookup table and/or and equation that relates the desired torque and the engine speed to the reference compressor pressure ratio. The reference pressure ratio module 208 outputs the reference compressor pressure ratio.

Figure 3:
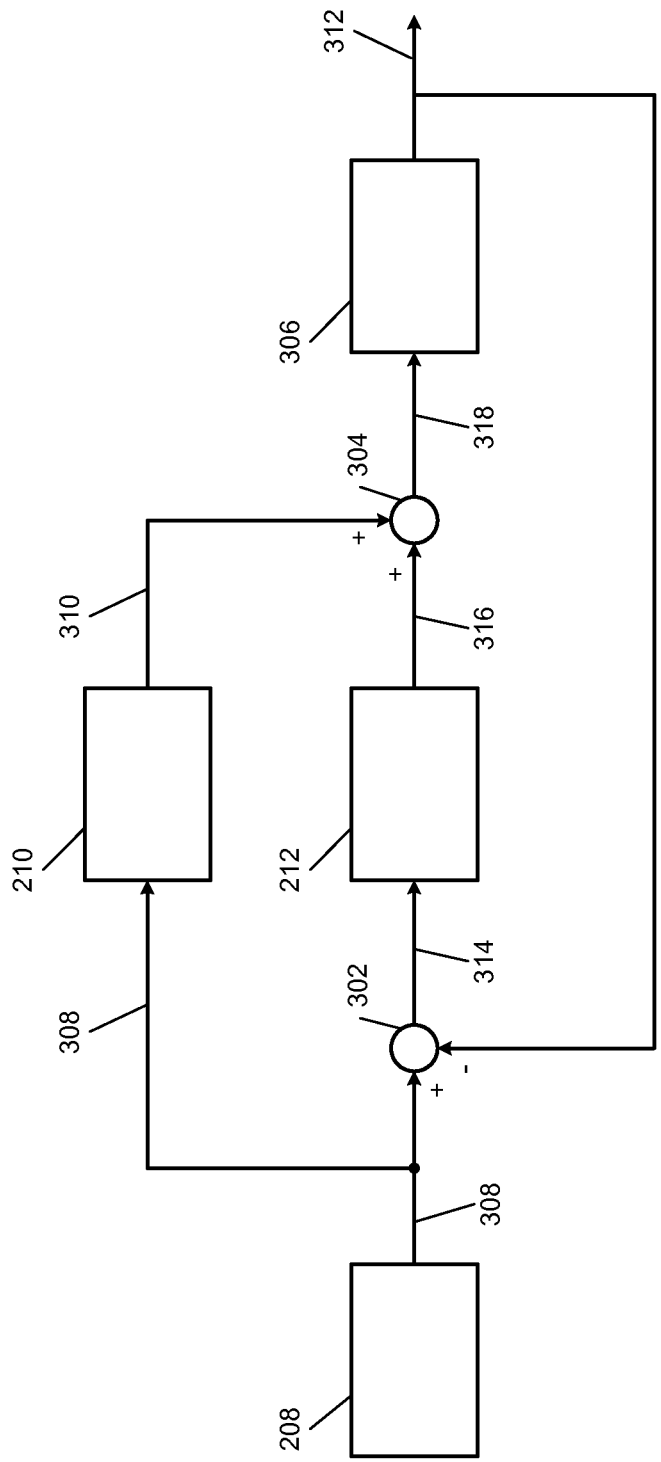

The example implementation of the ECM 114 shown in FIG. 3 further includes a target turbocharger position module 210, a turbocharger position adjustment module 212, and a turbocharger control module 214. The target turbocharger position module 210 determines a target turbocharger position using a physics-based model. The target turbocharger position may be a target value for the position of the wastegate 162 or for the position of vanes in a variable geometry turbocharger. In either case, the target turbocharger position module 210 may determine the target turbocharger position using the following relationship:

$$\dot{p}_{rc} = P_c - j + P_t, \quad (1)$$

where $\dot{p}_{rc}$ is a rate of change in the pressure ratio across the compressor 160-2, $P_c$ is the power output of the compressor 160-2, j is the inertia of a shaft in the turbine 160-1, and $P_t$ is the power output of the turbine 160-1.

If the target turbocharger position is a target position of a variable geometry turbocharger, relationship (1) can be expanded into the following relationship:

$$\dot{p}_{rc} = -c^* P_c - c^* Q_c^* \dot{Q}_c + h_t(a_0 + a_1 Q_e + a_2 Q_e^2 + a_3 u_{VGT} + a_4 Q_e u_{VGT}), \quad (2)$$

where $\dot{p}_{rc}$ is a rate of change in the pressure ratio across the compressor 160-2, c is a constant (e.g., a predetermined value), $P_c$ is the power output of the compressor 160-2, $Q_c$ is intake air flow, $\dot{Q}_c$ is a rate of change in the intake air flow, $h_t$ is the enthalpy of exhaust gas produced by the engine 102, $a_0$, $a_1$, $a_2$, $a_3$, and $a_4$ are learning coefficients, $Q_e$ is exhaust flow through the turbine 160-1, and $u_{VGT}$ is the target position of the variable geometry turbocharger.

If the target turbocharger position is a target position of the wastegate 162, relationship (1) can be expanded into the following relationship:

$$\dot{p}_{rc} = -c^* P_c - c^* Q_c \dot{Q}_c + g(t)(a_0 Q_{WG} + a_1 Q_{WG}^2 + a_2 Q_{WG}^3 + a_3 u_{WG} + a_4 Q_{WG} u_{WG}), \quad (3)$$

where $\dot{p}_{rc}$ is a rate of change in the pressure ratio across the compressor 160-2, c is a constant (e.g., a predetermined value), $P_c$ is the power output of the compressor 160-2, $Q_c$ is intake air flow, $\dot{Q}_c$ is a rate of change in the intake air flow, g(t) is a power transfer coefficient, $a_0$, $a_1$, $a_2$, $a_3$, and $a_4$ are learning coefficients, $Q_{WG}$ is a total exhaust flow through the turbine 160-1 and the wastegate 162, and $u_{WG}$ is the target position of the wastegate 162.

The target turbocharger position module 210 may determine the power output of the compressor 160-2 based on a pressure ratio across the compressor 160-2, the mass flow rate of intake air, the pressure of ambient air, and the temperature of ambient air using, for example, a lookup table and/or an equation. The target turbocharger position module 210 may receive the mass flow rate of intake air, the ambient air pressure, and the ambient air temperature from the MAF sensor 186, the IAT sensor 192, and the IAP sensor 194, respectively. When determining the target turbocharger position in a feedforward manner as described below with reference to FIG. 3, the target turbocharger position module 210 may determine the compressor power output based on the reference compressor pressure ratio. When determining the target turbocharger position in a feedback manner as described below with reference to FIG. 4, the target turbocharger position module 210 may determine the compressor power output based on an actual compressor pressure ratio.

The target turbocharger position module 210 may determine the intake air flow using the following relationship:

$$Q_c = \dot{m}_a \frac{\sqrt{T_a}}{p_a}, \qquad (4)$$

where $Q_c$ is the intake air flow, $\dot{m}_a$ is the mass flow rate of intake air from the MAF sensor 186, $T_a$ is the ambient air temperature from the IAT sensor 192, and $p_a$ is the ambient air pressure from the IAP sensor 194. The intake air flow determined using relationship (4) may be referred to as a corrected intake air flow since relationship (4) adjusts or corrects the mass flow rate of intake air based on the ambient air temperature and the ambient air pressure to yield the corrected intake air flow.

The target turbocharger position module 210 may determine the exhaust flow through the turbine 160-1 using the following relationship:

$$Q_e = \dot{m}_t \frac{\sqrt{T_{ex}}}{p_{to}}, \qquad (5)$$

where $Q_e$ is the exhaust flow, $\dot{m}_t$ is the mass flow rate of exhaust gas passing through the turbine 160-1, $T_{ex}$ is the exhaust gas temperature from the EXT sensor 196, and $P_{to}$ is the turbine outlet pressure from the TOP sensor 198. The exhaust flow determined using relationship (5) may be referred to as a corrected turbine exhaust flow since relationship (5) adjusts or corrects the mass flow rate of exhaust gas passing through the turbine 160-1 based on the ambient air temperature and the ambient air pressure to yield the corrected turbine exhaust flow.

The target turbocharger position module 210 may determine the mass flow rate of exhaust gas passing through the turbine 160-1 based on the mass flow rate of intake air from the MAF sensor 186 and the mass flow rate of fuel injected into cylinders of the engine 102. For example, the target turbocharger position module 210 may determine the sum of the mass flow rate of intake air and the mass flow rate of injected fuel to obtain the mass flow rate of exhaust gas passing through the turbine 160-1. The mass flow rate of injected fuel may be a commanded value.

The target turbocharger position module 210 may determine the total exhaust flow through the turbine 160-1 and the wastegate 162 using the following relationship:

$$Q_{WG} = \dot{m}_{ex} \frac{\sqrt{T_{ex}}}{p_{to}}, \qquad (6)$$

where $Q_{WG}$ is the total exhaust flow through the turbine 160-1 and the wastegate 162, $\dot{m}_{ex}$ is the mass flow rate of exhaust gas passing through the turbine 160-1 and the wastegate 162, $T_{ex}$ is the exhaust gas temperature from the EXT sensor 196, and $p_{to}$ is the turbine outlet pressure from the TOP sensor 198. The exhaust flow determined using relationship (6) may be referred to as a corrected exhaust flow since relationship (6) adjusts or corrects the mass flow rate of exhaust gas based on the ambient air temperature and the ambient air pressure to yield the corrected exhaust flow.

The target turbocharger position module 210 may determine the mass flow rate of exhaust gas passing through the turbine 160-1 and the wastegate 162 based on the mass flow rate of intake air from the MAF sensor 186 and the mass flow rate of fuel injected into cylinders of the engine 102. For example, the target turbocharger position module 210 may determine the sum of the mass flow rate of intake air and the mass flow rate of injected fuel to obtain the mass flow rate of exhaust gas passing through the turbine 160-1 and the wastegate 162. As noted above, the mass flow rate of injected fuel may be a commanded value.

The target turbocharger position module 210 may determine the power transfer coefficient of relationship (2) using the following relationship:

$$g(t) = \sqrt{T_{ex}} * p_{to}, \qquad (7)$$

where $g(t)$ is the power transfer coefficient, $T_{ex}$ is the exhaust gas temperature from the EXT sensor 196, and $p_{to}$ is the turbine outlet pressure from the TOP sensor 198.

When one or more engine operating conditions are steady-state, the target turbocharger position module 210 may set the rate of change in the compressor pressure ratio equal to zero and solve for the target turbocharger position using relationship (2) or (3). The engine operating conditions may include engine speed, intake air flow, and/or fuel flow. The target turbocharger position module 210 may determine that the engine operating conditions are steady state when a rate of change in the engine operating conditions is less than a predetermined rate. The target turbocharger position module 210 may determine that the engine operating conditions are transient when the rate of change in the engine operating conditions is greater than or equal to the predetermined rate.

When the engine operating conditions are transient, the target turbocharger position module 210 may determine the compressor pressure ratio using the following relationship:

$$p_{rc}(k) = p_{rc}(k-1) + \Delta p_{rc}, \qquad (8)$$

where $p_{rc}(k)$ is the compressor pressure ratio at a present iteration k, $p_{rc}(k-1)$ is the compressor pressure ratio at a previous iteration k−1, and $\Delta p_{rc}$ is a change in the compressor pressure ratio from the previous iteration to the present iteration. The target turbocharger position module 210 may determine the change in the compressor pressure ratio based on a product of the rate of change in the compressor pressure ratio and a sampling period between the previous and present iterations. The target turbocharger position module 210 may determine the rate of change in the compressor pressure ratio using relationship (2) or (3).

When determining the target turbocharger position in a feedforward manner as described below with reference to FIG. 3, the target turbocharger position module 210 may determine a first value of the compressor power output based on the reference compressor pressure ratio. When determining the target turbocharger position in a feedback manner as described below with reference to FIG. 4, the target turbocharger position module 210 may determine the first value of the compressor power output based on the actual compressor pressure ratio. When determining the target turbocharger position in either a feedforward or a feedback manner, the target turbocharger position module 210 may determine a first value of the turbine power output based on a previous value of the target turbocharger position. The target turbocharger position module 210 may then determine the rate of change in the compressor pressure ratio based on the first value of the compressor power output and the first value of the turbine power output using relationship (2) or (3).

Having determined the compressor pressure ratio using relationship (8), the target turbocharger position module 210 may set the rate of change in the compressor pressure ratio equal to zero and solve for the target turbocharger position using relationship (2) or (3). When doing so, the target turbocharger position module 210 may determine a second value of the compressor power output based on the reference compressor pressure ratio determined using relationship (8). The target turbocharger position module 210 may then determine the target turbocharger position based on the second value of the compressor power output using relationship (2) or (3).

The target turbocharger position module 210 may adjust or learn the learning coefficients of relationship (2) or (3) each time that the target turbocharger position module 210 determines the target turbocharger position. For example, the target turbocharger position module 210 may determine the learning coefficients using Kalman filtering or modified least squares such as that embodied in the following relationship:

$$\hat{\theta}_k = \hat{\theta}_{k-1} + L_k[y_k - \varphi_k^T * \hat{\theta}_{k-1}], \quad (9)$$

where $\varphi = [1 \; Q_e \; Q_e^2 \; u_{VGT} \; Q_e u_{VGT}]$ and $\theta^T = [a_0 \; a_1 \; a_2 \; a_3 \; a_4]$.

$\hat{\theta}_k$ is a vector representing predicted values of the learning coefficients at a present iteration k, $\hat{\theta}_{k-1}$ is a vector representing predicted values of the learning coefficients at a previous iteration k−1, $L_k$ is a predictive gain for the present iteration k, and $\varphi_k^T$ is a transpose of the vector identified above as $\varphi$ at the present iteration k. $y_k$ is, for the present iteration k, a ratio of (i) a sum of the compressor power output and the turbine shaft inertia to (ii) the enthalpy of exhaust gas produced by the engine 102.

The target turbocharger position module 210 may determine the predictive gain using the following relationship $$L_k = \frac{P_{k-1} * \varphi_k}{\lambda_k + \varphi_k^T * P_k * \varphi_k}, \quad (9)$$

where $P_{k-1}$ is a covariance matrix at the previous iteration k−1, $\varphi_k$ is the vector identified above as $\varphi$ at the present iteration k, $\lambda_k$ is a learning rate at the present iteration k, $\varphi_k^T$ is the transpose of the vector identified above as $\varphi$ at the present iteration k, and $P_k$ is the covariance matrix at the present iteration k.

The target turbocharger position module 210 may determine covariance matrix using the following relationship $$P_k = \left[ P_{k-1} - \frac{P_{k-1} * \varphi_k * \varphi_k^T * P_{k-1}}{\lambda_k + \varphi_k^T * P_{k-1} * \varphi_k} \right] / \lambda_k, \quad (10)$$

where $P_k$ is the covariance matrix at the present iteration k, $P_{k-1}$ is the covariance matrix at the previous iteration k−1, $\varphi_k$ is the vector identified above as $\varphi$ at a present iteration k, $\lambda_k$ is the learning rate at the present iteration k, and $\varphi_k^T$ is the transpose of the vector identified above as $\varphi$ at a present iteration k.

The amount by which the target turbocharger position module 210 learns turbocharger system parameters, such as the learning coefficients of relationships (1) and (2), may be limited or bounded using learning limits or bounds. The learning bounds may be applied each time that the target turbocharger position module 210 determines the target turbocharger position. For example, relationship (2) may be rewritten as $$\dot{p}_{rc} = f(t) + b(t) u_{VGT}, \text{ where } f(t) = -c^* P_c - c^* Q_c^* \dot{Q}_c + h_t(a_0 + a_1 Q_e + a_2 Q_e^2) \text{ and } b(t) = a_3 + a_4 Q_e. \quad (11)$$

In this case, the learning bounds may be: $b_{min} < b(k) < b_{max}$, where $b_{min}$ is a minimum value of function b at iteration k (e.g., b at iteration k−1 minus 30 percent), and $b_{max}$ is a maximum value of function b at iteration k (e.g., b at iteration k−1 plus 30 percent).

The turbocharger position adjustment module 212 determines an adjustment to the target turbocharger position based on an error in the compressor pressure ratio using a feedback approach. The turbocharger position adjustment module 212 subtracts the actual compressor pressure ratio from the reference compressor pressure ratio to obtain the compressor pressure ratio error. The turbocharger position adjustment module 212 may determine the adjustment to the target turbocharger position using a proportional-integral-derivative (PID) control technique such as that embodied in the following relationship:

$$u(t) = K_p e(t) + K_i \int_0^t e(\tau) d\tau + K_d \frac{de}{dt}, \quad (12)$$

where u(t) is the turbocharger position as a function of time (t), e(t) is the compressor pressure ratio error, and Kp, Ki, and Kd are coefficients for the proportional, integral, and derivative terms, respectively. The turbocharger position adjustment module 212 outputs the adjustment to the target turbocharger position.

The turbocharger control module 214 controls the turbocharger based on the target turbocharger position and the adjustment to the target turbocharger position. For example, the turbocharger control module 214 may adjust the target turbocharger position output by adding the adjustment to the target turbocharger position, and output the target turbocharger position as adjusted. The boost actuator module 164 may then adjust the position of the wastegate 162 to the target turbocharger position which, as noted above, may be a target position for the wastegate 162. Alternatively, if the turbocharger is a variable geometry turbocharger, the boost actuator module 164 may adjust the position of vanes in the turbocharger to the target turbocharger position which, as noted above, may be a target position for the vanes.

Referring now to FIG. 3, a system for determining the target turbocharger position in a feedforward manner is illustrated. The system of FIG. 3 includes the reference pressure ratio module 208, the target turbocharger position module 210, the turbocharger position adjustment module 212, a first summing junction 302, a second summing junction 304, and an engine subsystem 306. The engine subsystem 306 may be a subsystem of the engine system 100 and may include hardware components of the engine system 100 that are controlled by the ECM 114 such as the engine 102.

The reference pressure ratio module 208 determines reference compressor pressure ratio based on the desired torque and the engine speed as described above and outputs a signal 308 indicating the reference compressor pressure ratio. The target turbocharger position module 210 determines the target turbocharger position based on the reference compressor pressure ratio using relationship (2) or (3) as described above. More specifically, the target turbocharger position module 210 determines the compressor power output based on the reference compressor pressure ratio, and determines the target turbocharger position based on the compressor power output using relationship (2) or (3). The first target turbocharger position module 210 outputs a signal 310 indicating the target turbocharger position.

The first summing junction 302 determines a sum of the reference compressor pressure ratio indicated by the signal 308 and a negative value of the actual compressor pressure ratio indicated by a signal 312. Thus, in effect, the first summing junction 302 subtracts the actual compressor pressure ratio from the reference compressor pressure ratio. The first summing junction 302 outputs a signal 314 indicating the difference between the reference and actual compressor pressure ratios.

The turbocharger position adjustment module 212 determines the adjustment to the target turbocharger position based on the compressor pressure ratio error as described above. The turbocharger position adjustment module 212 outputs a signal 316 indicating the adjustment to the target turbocharger position. The second summing junction 304 determines a sum of the target turbocharger position indicated by the signal 310 and the adjustment to the target turbocharger position indicated by the signal 316. The second summing junction 304 outputs a signal 318 indicating the sum of the target turbocharger position and the adjustment to the target turbocharger position.

The engine subsystems 306 responds to the target turbocharger position indicated by the signal 318, resulting in a new value of the actual compressor pressure ratio indicated by the signal 312. In this manner, the target turbocharger position is adjusted in a feedback manner based on the actual compressor pressure ratio. In addition, the target turbocharger position is adjusted in a feedforward manner using relationship (2) or (3).

Figure 4:
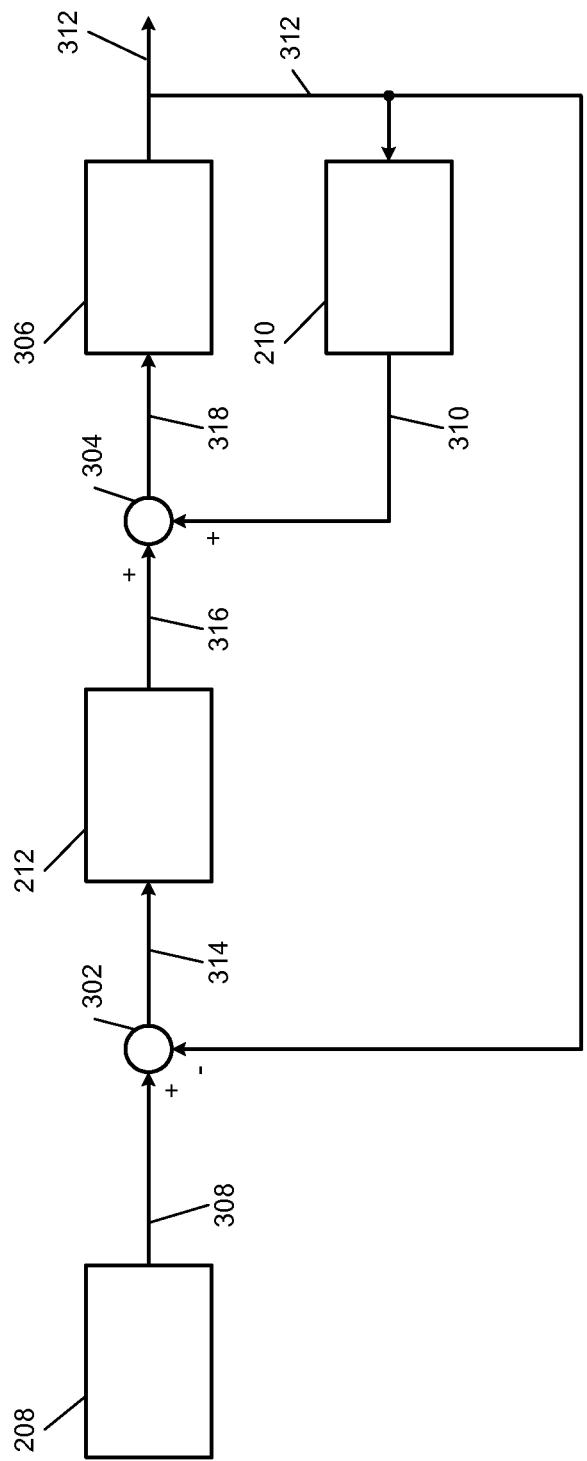

Referring now to FIG. 4, a system for determining the target turbocharger position in a feedback manner is illustrated. The system of FIG. 4 includes all of the same elements as the system of FIG. 3. However, in FIG. 4, the target turbocharger position module 210 does not determine the target turbocharger position based on the reference compressor pressure ratio indicated by the signal 308. Instead, the target turbocharger position module 210 determines the target turbocharger position based on the actual compressor pressure ratio indicated by the signal 312. Thus, the target turbocharger position is adjusted in a feedback manner using relationship (2) or (3).

Figure 5:
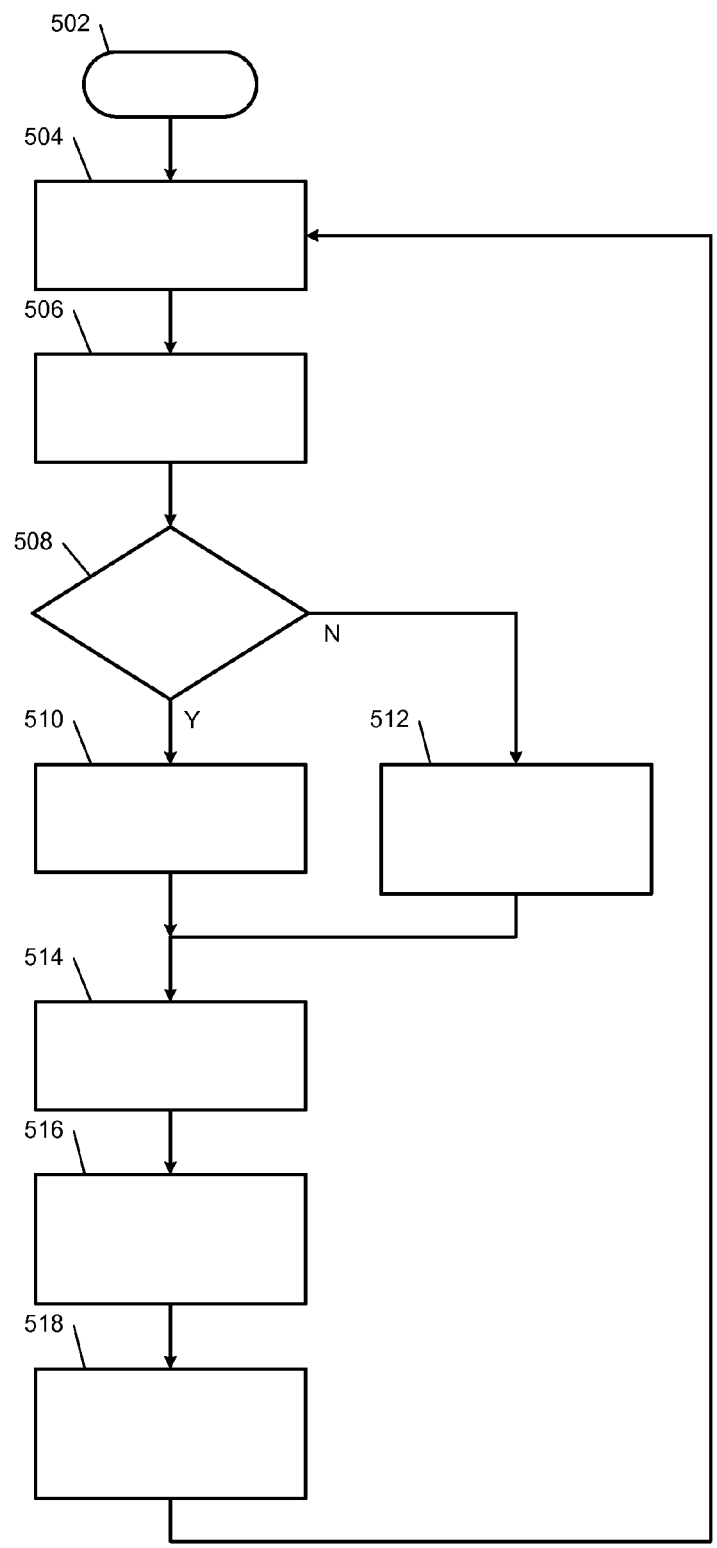
FIG. 5 is a flowchart illustrating an example control method according to the principles of the present disclosure.

Referring now to FIG. 5, an example method for adaptively learning values and controlling a turbocharger of an engine based on the learned values begins at 502. The method is described in the context of the modules of FIG. 2. However, the particular modules that perform the steps of the method may be different than the modules mentioned below and/or the method may be implemented apart from the modules of FIG. 2.

At 504, the actual pressure ratio module 206 determines the actual pressure ratio across the compressor 160-2 of the turbocharger. As discussed above, the actual pressure ratio module 206 may determine the actual compressor pressure ratio based on the manifold pressure measured by the MAP sensor 184 and the ambient pressure measured by the IAP sensor 194. At 506, the reference pressure ratio module 208 determines the reference pressure ratio across the compressor 160-2. The reference pressure ratio module 208 may determine the reference compressor pressure ratio based on the desired torque and the engine speed as described above.

At 508, the target turbocharger position module 210 determines whether engine operating conditions are transient. The engine operating conditions may include engine speed, intake air flow, and/or fuel flow. The target turbocharger position module 210 may determine that the engine operating conditions are steady state when a rate of change in the engine operating conditions is less than a predetermined rate. The target turbocharger position module 210 may determine that the engine operating conditions are transient when the rate of change in the engine operating conditions is greater than or equal to the predetermined rate. If the engine operating conditions are transient, the method continues at 510. Otherwise the method continues at 512.

At 510, the target turbocharger position module 210 determines the target turbocharger position using a transient model. More specifically, the target turbocharger position module 210 determines a rate of change in the compressor pressure ratio using relationship (2) or (3). The target turbocharger position module 210 then determines a present value of the compressor pressure ratio based on a previous value of the compressor pressure ratio and the rate of change in the compressor pressure ratio using relationship (8).

The target turbocharger position module 210 may then determine the target turbocharger position based on the present value of the compressor pressure ratio using a steady-state module. More specifically, the target turbocharger position module 210 may determine the compressor power output based on the present value of the compressor pressure ratio and set the rate of change in the compressor pressure ratio equal to zero. The target turbocharger position module 210 may then solve for the target turbocharger position using relationship (2) or (3).

At 512, the target turbocharger position module 210 determines the target turbocharger position based on the reference compressor pressure ratio or the actual compressor pressure ratio using a steady-state model. More specifically, the target turbocharger position module 210 sets the rate of change in the compressor pressure ratio equal to zero and solves for the target turbocharger position using relationship (2) or (3). The target turbocharger position module 210 determines the compressor power output based on the reference compressor pressure ratio when using the feedforward approach of FIG. 3.

When determining the rate of change in the compressor pressure ratio at 510 or determining the target turbocharger position at 512, the target turbocharger position module 210 determines the compressor power output based on the actual or reference compressor pressure ratio. The target turbocharger position module 210 determines the compressor power output based on the reference compressor pressure ratio when using the feedforward approach of FIG. 3. The target turbocharger position module 210 determines the compressor power output based on the actual compressor pressure ratio when using the feedback approach of FIG. 4.

At 514, the turbocharger position adjustment module 212 determines the adjustment to the target turbocharger position based on the error in the compressor pressure ratio using, for example, relationship (12) as described above. At 516, the turbocharger control module 214 controls the turbocharger based on the target turbocharger position and the adjustment to the target turbocharger position as described above. At 518, the target turbocharger position module 210 adjusts or learns the learning coefficients of relationships (1) and (2) using relationships (8) through (10) as described above. The method then executes another iteration of the control loop depicted in FIG. 5 and the target turbocharger position module 210 uses the learning coefficients as adjusted to determine a new value of the target turbocharger position.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a target turbocharger position circuit that determines a target position of a turbocharger based on a relationship between power generated by a compressor of the turbocharger, inertia of a shaft in a turbine of the turbocharger, and power generated by the turbine, wherein the target turbocharger position includes at least one of a target vane position and a target wastegate position; and
   a turbocharger control circuit that controls the turbocharger based on the target turbocharger position, wherein the target turbocharger position circuit determines the turbine shaft inertia based on an amount of intake air flow through the compressor and a rate of change in the amount of intake air flow through the compressor.

2. A system comprising:
   a target turbocharger position circuit that determines a target position of a turbocharger based on a relationship between power generated by a compressor of the turbocharger, inertia of a shaft in a turbine of the turbocharger, and power generated by the turbine, wherein the target turbocharger position includes at least one of a target vane position and a target wastegate position; and a turbocharger control circuit that controls the turbocharger based on the target turbocharger position, wherein:

the relationship includes a first term representing the compressor power, a second term representing the turbine shaft inertia, and a third term representing the turbine power; and the third term is a function of enthalpy of exhaust gas, the target turbocharger position, exhaust flow rate through at least one of the turbine and a wastegate that allows exhaust to bypass the turbine, and learning coefficients.

3. The system of claim 2 wherein the target turbocharger position circuit adjusts the learning coefficients each time that the target turbocharger position is determined.

4. The system of claim 2 wherein the target turbocharger position circuit adjusts the learning coefficients based on a learning rate and an exhaust flow rate.

5. The system of claim 2 wherein, in response to engine operating conditions being steady state, the target turbocharger position circuit sets a sum of the first, second, and third terms equal to zero and solves for the target turbocharger position.

6. The system of claim 2 wherein, in response to engine operating conditions being transient, the target turbocharger position circuit:

determines a first value of the compressor power based on a previous value of the target turbocharger position;

determines a change in a pressure ratio across the compressor based on a sum of the first, second, and third terms using the first value of the compressor power for the first term;

determines a present value of the pressure ratio across the compressor based on a sum of a previous value of the pressure ratio across the compressor and the change in the pressure ratio across the compressor;

determines a second value of the compressor power based on the present value of the pressure ratio;

sets a sum of the first, second, and third terms equal to zero; and solves for the target turbocharger position using the second value of the compressor power for the first term.

7. The system of claim 2 wherein the target turbocharger position circuit determines the compressor power based on a pressure ratio across the compressor, a mass flow rate of ambient air, a pressure of ambient air, and a temperature of ambient air.

8. The system of claim 7 wherein the target turbocharger position circuit determines the compressor power based on a reference value for the pressure ratio across the compressor.

9. The system of claim 7 wherein the target turbocharger position circuit determines the compressor power based on an actual value of the pressure ratio across the compressor.

10. A method comprising:

determining a target position of a turbocharger based on a relationship between power generated by a compressor of the turbocharger, inertia of a shaft in a turbine of the turbocharger, and power generated by the turbine, wherein the target turbocharger position includes at least one of a target vane position and a target wastegate position;

controlling the turbocharger based on the target turbocharger position; and determining the turbine shaft inertia based on an amount of intake air flow through the compressor and a rate of change in the amount of intake air flow through the compressor.

11. A method comprising:

determining a target position of a turbocharger based on a relationship between power generated by a compressor of the turbocharger, inertia of a shaft in a turbine of the turbocharger, and power generated by the turbine, wherein the target turbocharger position includes at least one of a target vane position and a target wastegate position; and controlling the turbocharger based on the target turbocharger position, wherein:

the relationship includes a first term representing the compressor power, a second term representing the turbine shaft inertia, and a third term representing the turbine power; and the third term is a function of enthalpy of exhaust gas, the target turbocharger position, exhaust flow rate through at least one of the turbine and a wastegate that allows exhaust to bypass the turbine, and learning coefficients.

12. The method of claim 11 further comprising adjusting the learning coefficients each time that the target turbocharger position is determined.

13. The method of claim 11 further comprising adjusting the learning coefficients based on a learning rate and an exhaust flow rate.

14. The method of claim 11 further comprising, in response to engine operating conditions being steady state, setting a sum of the first, second, and third terms equal to zero and solving for the target turbocharger position.

15. The method of claim 11 wherein, in response to engine operating conditions being transient, the method further comprises:

determining a first value of the compressor power based on a previous value of the target turbocharger position;

determining a change in a pressure ratio across the compressor based on a sum of the first, second, and third terms using the first value of the compressor power for the first term;

determining a present value of the pressure ratio across the compressor based on a sum of a previous value of the pressure ratio across the compressor and the change in the pressure ratio across the compressor;

determining a second value of the compressor power based on the present value of the pressure ratio;

setting a sum of the first, second, and third terms equal to zero; and solving for the target turbocharger position using the second value of the compressor power for the first term.

16. The method of claim 11 further comprising determining the compressor power based on a pressure ratio across the compressor, a mass flow rate of ambient air, a pressure of ambient air, and a temperature of ambient air.

17. The method of claim 16 further comprising determining the compressor power based on a reference value for the pressure ratio across the compressor.

18. The method of claim 16 further comprising determining the compressor power based on an actual value of the pressure ratio across the compressor.

* * * * *